United States Patent Office 3,074,249
Patented Jan. 22, 1963

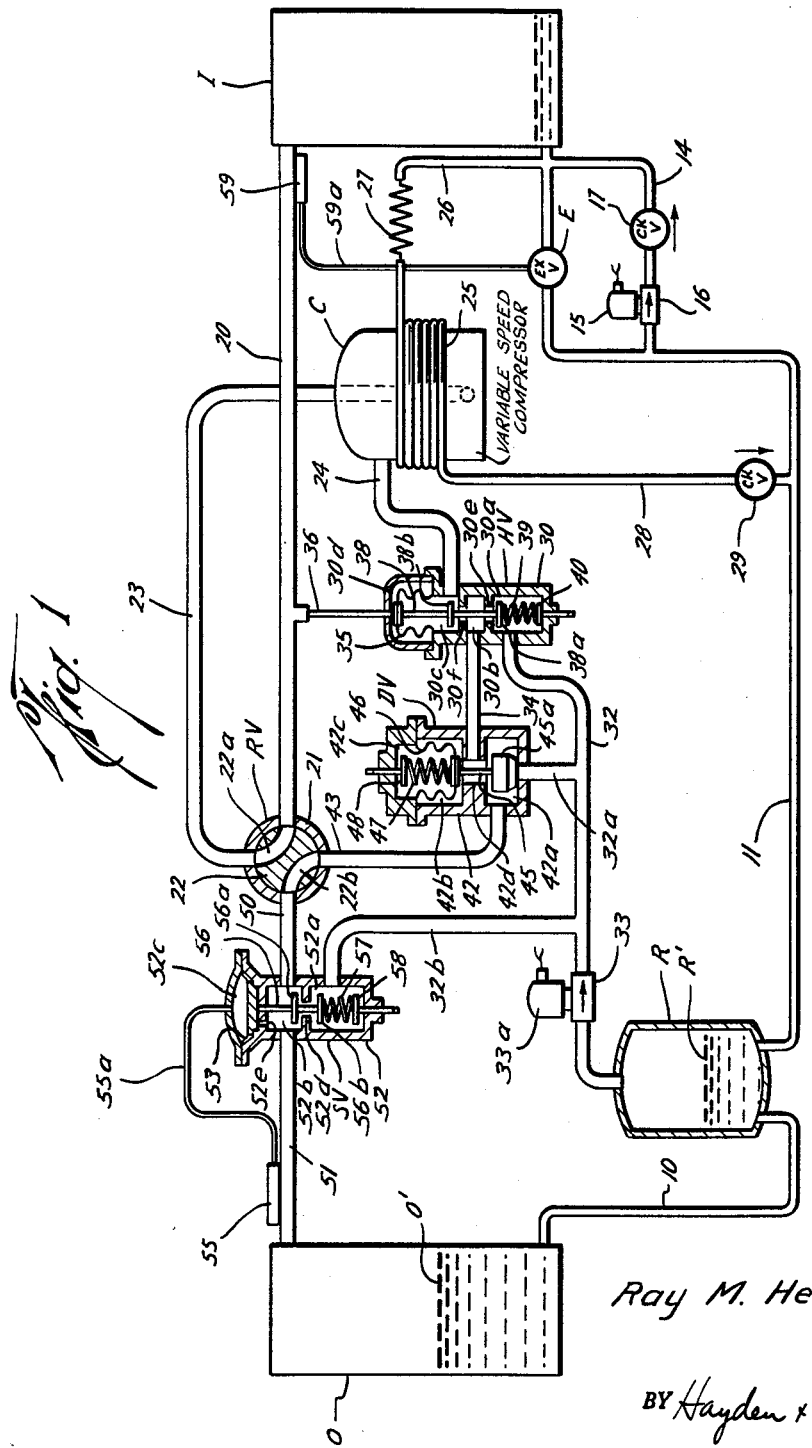

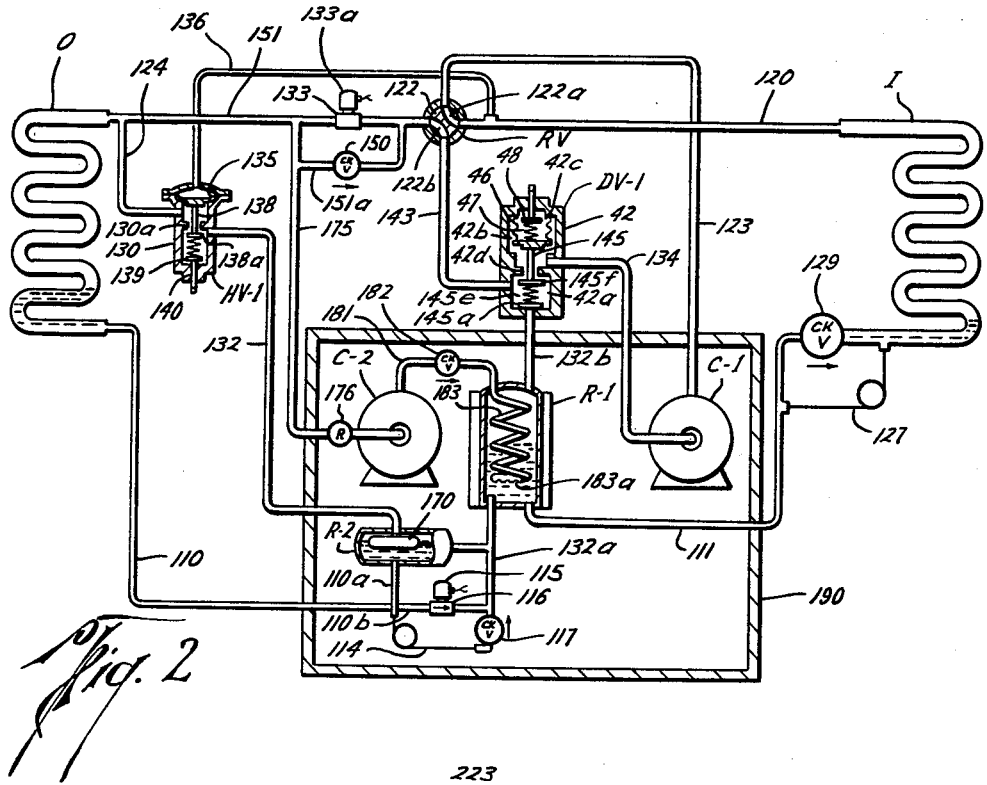
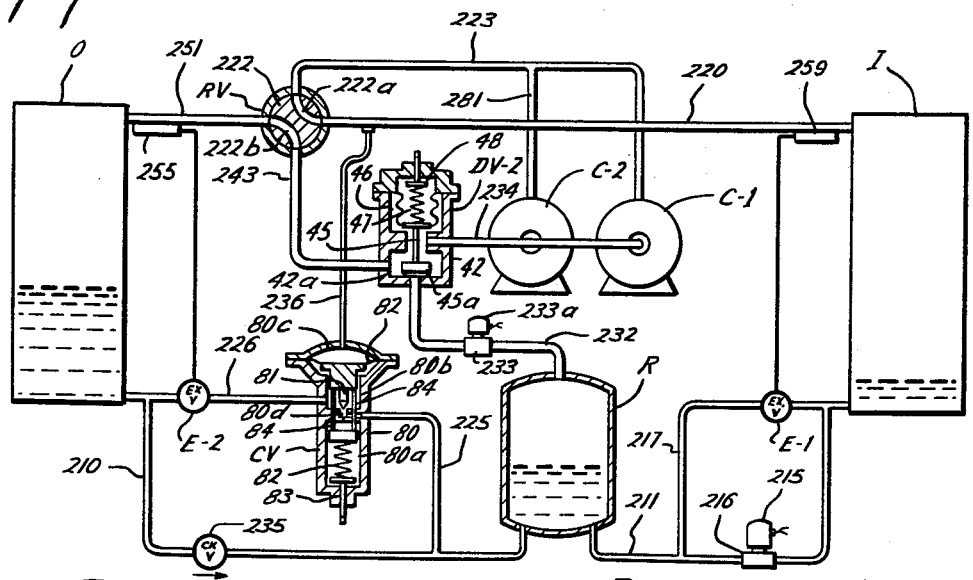

3,074,249
REFRIGERATION SYSTEM AND APPARATUS HAVING A HEATING CYCLE AND A COOLING CYCLE
Ray M. Henderson, 139 E. Ridgewood Court, San Antonio 12, Tex.
Filed June 15, 1960, Ser. No. 36,200
12 Claims. (Cl. 62—149)

This invention relates to new and useful improvements in refrigeration systems and apparatus having a heating cycle and a cooling cycle.

Today, the term "heat pump" is commonly used in referring to refrigeration apparatus having a heating cycle and a cooling cycle, and therefore such term is used herein. Heat pumps, as known today, fall into the general categories of "air to air," "water to air," "air to water," and "water to water." In the air to air heat pump, the heat from the condenser is transferred to the air, and the evaporator absorbs heat from the air. In the water to air heat pump, the evaporator absorbs heat from water, and the heat from the condenser is transferred to the air. In the air to water heat pump, the evaporator absorbs heat from the air, and the heat from the condenser is transferred to water. In the water to water heat pump, the evaporator absorbs heat from water, and the heat from the condenser is transferred to water.

Although this invention is not limited to air to air heat pumps, such types of heat pumps are the most common type used today for home installations and therefore, the present invention is especially important for the air to air type. Heretofore, in the operation of air to air heat pumps for space heating, it has been common practice to use supplementary heat such as electrical resistance strip heaters to supplement the heating with the heat pump itself during cold weather because the systems and apparatus heretofore known have been inadequate to supply the heat under cold weather conditions.

Additionally, because of the wide difference between the minimum displacement requirements of the cooling cycle and the maximum displacement requirements of the heating cycle of heat pumps in most climates, compression staging has been attempted, but the changes caused by the staging methods heretofore proposed have been so wide and abrupt that the control of the operation of the system has been extremely difficult and inefficient.

Another major disadvantage of previously known heat pumps resides in their tendency towards overloading at the beginning of a cycle and underloading due to temperature changes. The overloading condition of ordinary refrigeration systems during the initial stage of operation has made it necessary to provide extra power for a "pull down" or in some cases, suction pressure regulators have been used, but such means or methods have been found entirely inadequate in performance and impractical in application in the operation of heat pumps.

Another reason for low efficiency in the operation of heat pumps, is the failure of conventional refrigerating methods to properly utilize the unrejected heat that remains in the liquid after it leaves the condenser. It is a definitely established fact, that a considerable amount of the latent heat of vaporization is used in the evaporator to dissipate flash gas and reduce the temperature of warm liquid transferred to the evaporator through expansion valves or other ordinary liquid metering devices.

A still further reason for low efficiency of heat pump operation, and one of the principal reasons for use of supplementary heat, is the excessive amount of time required in the defrost operation. The heating operation must be interrupted during defrost, and therefore defrosting must be accomplished in a very short period of time, if supplementary heating is to be avoided.

It is an object of this invention to provide a new and improved heat pump which overcomes the defects and disadvantages of the prior heat pumps.

An important object of this invention is to provide a new and improved heat pump which is capable of functioning satisfactorily on the heating cycle when the outside air temperature is as low as 0° F. or even lower, and without requiring supplemental heating.

Another important object of this invention is to provide a new and improved heat pump wherein the absorption of heat at the evaporator is correlated with the demand for heat discharge at the condenser by controlling the flow of refrigerant to the evaporator in response to temperature and pressure changes in the condenser.

A further object of this invention is to provide a new and improved heat pump employing compression staging wherein gradual changes in the high and low side pressures are accomplished to prevent overloading or unloading of the system under different conditions.

Still another object of this invention is to provide a new and improved heat pump wherein the unrejected heat that remains in the liquid after it leaves the condenser is more fully utilized than in prior heat pumps.

A particular object of this invention is to provide a new and improved heat pump which has in combination therewith means for defrosting the outdoor coil rapidly to thereby eliminate the need for supplemental heating during the defrost cycle.

A specific object of this invention is to provide, in a closed refrigerant circuit a heat pump, a method of capacity control wherein the level of the evaporating liquid refrigerant in an evaporator of said circuit is raised to increase the amount of effective heat transfer surface used for the transfer of heat by said evaporator, which raising is in response to an increase in the demand for heat on the high side of the circuit, and wherein the level of the evaporating liquid refrigerant in the evaporator is lowered to decrease the amount of effective heat transfer surface used for the transfer of heat, which lowering is in response to a decrease in the demand for heat on the high side, whereby the rate of heat absorption on the low side of the circuit is proportionate to the demand for heat on the high side of the circuit.

The preferred embodiment of this invention will be described hereinafter, together with other features thereof, and additional objects will become evident from such description.

The invention will be more readily understood from the reading of the following specification and by reference to the accompanying drawings forming a part thereof, wherein an example of the invention is shown, and wherein:

FIG. 1 is a schematic illustration of one form of the system and appartus of this invention;

FIG. 2 is a schematic diagram of another form of the invention; and,

FIG. 3 is a schematic view of another form of the invention.

In the drawings, the letter O designates generally a heat transfer unit and the letter I designates generally another heat transfer unit. The heat transfer unit I is positioned within an enclosure such as a housing or building for either transferring heat to the enclosure or for cooling the space within the enclosure. The heat transfer unit I is therefore designated an indoor coil which serves as a condenser during the heating cycle of the apparatus of this invention and which serves as an evaporator during the cooling cycle of the apparatus. The heat transfer unit O is located outside of the enclosure such as the house or building and normally, such unit O would be in the outside air. Such unit O is therefore designated as the outdoor coil which serves as an evaporator on the heating cycle of the apparatus of this invention and which serves as the condenser on the cooling cycle of the apparatus of this invention. As will be explained more in detail, the outdoor coil O and the indoor coil I are interconnected with suitable flow lines or pipes to form a closed circuit. A receiver R which also serves as an accumulator and an evaporator, as will be explained, is located in such flow lines for receiving refrigerant. Also, one or more compressors C are provided and are connected in the flow lines for compressing the refrigerant from the evaporator and for transmitting such refrigerant to the condenser. The apparatus of this invention is provided with valve controls and other control means so that heating and cooling cycles may be obtained, as well as a rapid defrost cycle. As will be more evident hereinafter, when using the apparatus of this invention on the heating cycle, the liquid level of the refrigerant in the heat transfer unit or coil serving as the evaporator is controlled in response to the demand for heat by the heat transfer unit or coil serving as the condenser to impart heat to the enclosure such as the housing or building.

Considering now the details of the form of the invention shown in FIG. 1 of the drawings, the outdoor coil or unit O is connected with the receiver R by means of a flow line or pipe 10 for the flow of refrigerant therebetween. The receiver R is connected with the indoor coil I by means of a flow line or pipe 11 which has an expansion valve E therein for expanding the refrigerant in the known manner when the indoor coil is serving as the evaporator, as will be explained. A bypass line 14 is connected from the flow line 11 to the indoor coil I and it includes an electrically operated solenoid 15 and a solenoid operated valve 16 for periodically bypassing fluid through the line 14 for the defrost operation as will be explained. A check valve 17 is also in the bypass line 14 for permitting flow in the direction of the arrow as shown in FIG. 1 but for preventing flow in the opposite direction. The indoor unit or coil I is also connected with another flow line 20 which extends to a reversing valve RV. The reversing valve RV is schematically shown in FIG. 1 and it may be of any suitable construction. As shown, the reversing valve RV includes a stationary body 21 and a rotatable valve element 22 therein having flow passages 22a and 22b.

Another flow line 23 connects the reversing valve RV with the discharge side of the compressor C. The compressor C is preferably of the variable speed type and may be any compressor of such type that is known. The speed of such compressor C may be varied in any known manner with thermostat controls. Such thermostat controls are located outside of the enclosure in which indoor coil I is located.

The suction side of the compressor C is connected with a flow line 24 which extends to a heat control valve HV. The compressor C also has a coil 25 surrounding same in heat transfer relationship for absorbing heat from the compressor C. This is accomplished because the coil 25 is connected to the liquid refrigerant in the unit or coil I on the heating cycle through a flow line 26 and a capillary tube 27. The capillary tube 27 functions in the known manner for providing expansion of the refrigerant to pick up heat being discharged from the external surface of the compressor C, which heat is ordinarily dissipated and wasted. The refrigerant from the coil 25 flows through line 28 and check valve 29 to the flow line 11. It is to be noted that the check valve 29 is open for flow in the direction of the arrow as indicated in FIG. 1, but is closed with respect to flow in the opposite direction to the arrow.

The heat control valve HV includes a body 30 which is divided into four chambers 30a, 30b, 30c and 30d. The chamber 30a is in fluid communication with a flow line 32 which extends from the receiver R and which has a solenoid operated valve 33 in such line for controlling flow. As will be explained more in detail, the valve 33 has a solenoid 33a therewith which functions to close the valve 33 during the cooling cycle and to open such valve 33 during the heating and defrosting cycles. The chamber 30b is in fluid communication with a flow line 34 which extends from defrost valve DV, the purpose of which will be explained. The chamber 30c is connected to the compressor C through the flow line 24 as previously mentioned. The chamber 30d is separated from the chamber 30c by means of a flexible diaphragm 35 formed of a flexible metallic alloy of brass or other similar material, and such chamber 30d is in fluid communication with the flow line 20 through a tube 36.

The chambers 30a and 30b are interconnected by a port 30e and the chamber 30b and 30c are similarly interconnected by a port 30f. The opening and closing of such ports 30e and 30f is controlled by a valve member 38 which has valve heads 38a and 38b formed thereon. The valve member 38 is connected at its upper end to the diaphragm 35 for movement in accordance with the pressure differential across the diaphragm 35. The valve member 38 is also engaged by a spring or resilient member 39 at its lower end for applying an upward force to the valve member 38. The force of such spring 39 is sufficient to close the port 30e in the absence of any pressure in the chamber 30d, but when the pressure in the chamber 30d exceeds the pressure in the chamber 30c by a predetermined amount which is sufficient to overcome the force of the spring 39, then the valve member 38 is moved downwardly to open the port 30e. The amount of force applied with the spring 39 may be increased or decreased by an adjusting member 40 which is preferably threaded in the housing or body 30 of the valve HV for movement upwardly and downwardly with respect to such body 30. Thus, as the adjusting member is moved upwardly, the spring 39 is compressed to cause it to exert a greater upward force on the valve member 38.

The valve DV includes a body or housing 42 which is provided with chambers 42a, 42b and 42c. The chambers 42a and 42b are interconnected with a port 42d. The chamber 42a is also in fluid communication with a pipe or flow line 43 which extends to the valve RV. Also, as previously mentioned, the line 34 from the valve HV extends to the valve DV and is in fluid communication with the port 42d. Within the body 42 of the valve DV, there is a valve member 45 which has a valve head 45a thereon for movement longitudinally within such body 42. The head 45a is adapted to open and close flow from the chamber 42a through the port 42d to the line 34. Also, the valve head 45a is adapted to open or close flow into the chamber 42a from the flow line 32a extending from the flow line 32. The upper end of the valve 45 is connected to a diaphragm 46 which is formed of a flexible metallic alloy of brass or other similar material, such diaphragm 46 serving to divide or separate chambers 42b and 42c. A spring 47 acts to urge the valve member 45 downwardly with a predetermined force which may be regulated by an adjusting member 48 which is operated in the manner previously described in connection with the adjusting member 40. The location of the valve head 45a is thus determined by the differential in pressure across the diaphragm 46 which is determined by the fluid pressure within the chamber 42b and the spring pressure from the spring 47. As will be explained, the valve DV is in the closed position and as illustrated in the drawings except during the defrost cycle of the system, at which time the valve member 45a is moved to intermediate points or to varying positions permitting flow from the lines 43 and 32a into the chamber 42a and also through the port 42d to the line 34.

A super heat valve SV is also provided in the system or apparatus of this invention as shown in FIG. 1, and such valve SV is connected to the reversing valve RV by a flow line or pipe 50. The valve SV is connected to the flow line 32 by a flow line 32b. Also, the valve SV is connected with the outdoor unit or coil O by a flow line or pipe 51. The valve SV has a body or housing 52 which has internal fluid chambers 52a, 52b, and 52c. The chambers 52a and 52b are interconnected by a port 52d. A breather hole 52e is also provided as shown. The flow line 32b is in fluid communication with the fluid chamber 52a, and the lines 50 and 51 are in fluid communication with the fluid chamber 52b. A diaphragm 53 is positioned in the chamber 52c and is provided with air or other fluid under pressure above such diaphragm 53. The portion of the chamber 52c above the diaphragm 53 is in communication with a temperature bulb 55 of known construction by means of a tube 55a. When the temperature of the bulb 55 reaches a certain point, the pressure of the air or other fluid within the chamber 52c reaches a sufficient amount to apply a downward pressure to the diaphragm 53 for closing fluid flow through the valve SV. The diaphragm 53 is connected with a valve element 56 which has a valve head 56a therewith. A spring 57 acts against flange 56b to apply a predetermined force to the valve member 56 for urging same upwardly and such spring force is adjustable by longitudinally moving an adjusting plate or screw member 58 relative to the body 52 in the same manner as previously explained in connection with the adjusting member 40. The spring pressure 57 is set so as to cause the passage or port 52d open and close during the heating cycle in accordance with fluctuations in the temperature at the bulb 55. When the level of the liquid in the coil O rises to such an extent that the refrigerant is absorbing heat from the bulb 55, the pressure on the diaphragm 53 is reduced sufficiently to permit the spring 57 to move the valve head 56a toward open position. Obviously, the reverse effect is obtained when the liquid level of the refrigerant in the coil O falls so that the valve is again moved toward closed position to reduce flow through the port 52d. During the cooling and defrosting cycles, the pressure of the air or other fluid in the chamber 52c above the diaphragm 53 is sufficient to force the valve head 56b into a seated position to close the port or opening 52d, whereby fluid may flow through the valve from the line 50 to the line 51, but fluid flow from the flow line 32b is closed.

The expansion valve E is also preferably controlled by a temperature bulb 59 which is connected to the valve E with a tube 59a. The bulb 59 is set to operate the expansion valve E in the known manner so that flow through the valve E is regulated during the cooling cycle. However, during the heating and the defrost cycles, the valve E is closed due to the back pressure acting thereon from the coil I.

Considering now the operation of the apparatus of FIG. 1 in carrying out the method of this invention, the heating cycle will first be explained. During the heating cycle, the outdoor coil or unit O serves as an evaporator and the indoor unit or coil I serves as a condenser. The reversing valve RV is in the position illustrated in FIG. 1, and likewise each of the valves HV, DV and SV are in the positions shown in FIG. 1. Therefore, gaseous refrigerant from the evaporator or outdoor coil O will flow through the line 51 and the valve SV to the line 50. The refrigerant will then flow through the reversing valve RV to the line 43 and then through the defrosting valve DV to the valve HV by way of the flow line 34. The gaseous refrigerant is then supplied to the compressor C from line 24. The compressed refrigerant is discharged from the compressor C through line 23 for flow through the reversing valve RV to the flow line 20 which discharges into the condenser or indoor coil I. The indoor coil I thus transmits heat to the enclosure for heating the enclosure or the space within the building. If the transfer of the heat is directly to air, such heat transfer may be facilitated by blowers or fans (not shown) of any conventional construction. However, it will be understood that such heat transfer may also be conducted to water or other fluids.

The condensed refrigerant then flows to line 26 for expansion through the capillary tube 27, whereby a cooling of the external surface of the compressor C is effected for the purpose of absorbing heat and returning it to the system, as previously pointed out. It is to be noted that the expansion valve E is closed during the heating cycle and the check valve 17 is likewise closed to flow from the coil I through the line 14. The refrigerant from the line 28 flows through the check valve 29 to the flow line 11 and then it flows to the receiver R. The receiver R normally has a certain amount of liquid refrigerant in the lower portion thereof and a certain amount of gaseous refrigerant in the upper portion thereof. The level of the liquid refrigerant in the receiver R is indicated by the letter R', and it will be appreciated that such level will vary. The liquid refrigerant in the receiver R flows to the evaporator or outdoor coil O through the flow line 10 and evaporation of the refrigerant from a liquid state to a gaseous state takes place in such outdoor coil O on the heating cycle. Therefore, the level of the liquid refrigerant in the outdoor coil O is indicated by the letter O' and it will be understood that the gaseous refrigerant would be above the level O' of the liquid refrigerant. The height or the level O' of the liquid in the outdoor coil O when such coil serves as an evaporator during the heating cycle of the apparatus of this invention will be varied to provide varying amounts of heat transfer surface between the liquid refrigerant and the outside air or other medium. By so regulating the level of the liquid refrigerant in the coil O, the amount of the evaporation in the coil O is thereby controlled.

In order to control the level O' of the liquid refrigerant in the evaporator coil O during the heating cycle, the valve 33 is opened by the solenoids 33a, which solenoid 33a may be operated by any suitable means such as a thermostat which is set to operate the solenoid 33a to open the valve 33 during the heating cycle. Thus, the line 32 from the receiver R is in fluid communication with the valve HV. Therefore, when the valve member 38 is in the position shown in FIG. 1, the gaseous refrigerant in the receiver R about the level R' of the liquid refrigerant is removed from the receiver R and is passed to the compressor C. As the gaseous refrigerant is removed from the receiver R, the pressure in the receiver R is lowered which causes evaporation of the liquid refrigerant within the receiver R. It will be understood that the heat for such evaporation is provided by the liquid refrigerant flowing into the receiver R from the line 11. The pressure of the gaseous refrigerant in the receiver R must balance the pressure of the gaseous refrigerant in the coil O plus the head of liquid refrigerant in the coil O above the level of the liquid refrigerant in in the receiver R. Therefore, when a sufficient amount of the gaseous refrigerant is removed from the receiver R to reduce the pressure in the receiver R below the pressure of the gaseous refrigerant in the coil O and the head of liquid refrigerant therein above the level of the liquid refrigerant in the receiver R, the level of the liquid refrigerant in the coil O will fall or decrease until the balanced condition of pressure is again reached. It will be understood that as the level O' of the liquid refrigerant in the evaporator O is lowered or falls, the heat transfer area of the liquid refrigerant in the coil O is reduced and therefore less evaporation takes place in the coil O. As the evaporation of the refrigerant in the coil O is thus reduced, the amount of heat picked up from the outside air or other medium is reduced so that less heat is ultimately transferred to the refrigerant for discharge at the condenser I. Conversely, as the level O' of the liquid refrigerant in the evaporator coil O increases during the heating cycle, there will be a greater heat transfer from the outside air or other medium to the liquid refrigerant and therefore a greater amount of evaporation of the refrigerant which will in turn supply a greater amount of heat to the refrigerant and ultimately to the coil I for heating the enclosure or space.

The level of the liquid refrigerant in the coil O is controlled during the heating cycle by controlling the flow of the gaseous refrigerant through line 32 or from the receiver R to the valve HV and then to the compressor C. Such flow through line 32 is controlled by controlling the opening and closing of the port 30e with the valve head 38a. The pressure on the high side of the circuit controls the opening and closing of the valve head 38a with respect to the port 30e because of the tube or connection 36 between the high side flow line 20 and the chamber 30d. Thus, the valve HV is set so that when the pressure in the flow line 20 and therefore in the chamber 30d is extremely high because of the low heat requirement at the indoor coil I, then the valve member 38 is urged downwardly to position the valve head 38a as shown in FIG. 1 for permitting the fluid flow from the receiver R through the valve HV to the condenser C. As previously pointed out, when the gaseous refrigerant is permitted to flow through the line 32 to the compressor C, the level O' of the liquid refrigerant in the outdoor coil O serving as an evaporator falls to thereby reduce the heat transfer surface of the liquid refrigerant in the outdoor coil O. Thus, when the demand for heat at the coil I is relatively low, the level of the liquid refrigerant in the coil O drops or is lowered so that less heat is picked up from the air or other medium surrounding the coil O. On the other hand, when the heat requirement or demand at the indoor coil increases, the effect will be to produce a lower temperature and pressure in the coil I which will thereby reduce the pressure in the line 36 and the chamber 30d. The reduction in pressure will then permit the spring 39 to move the valve head 38a to reduce the flow of the gaseous refrigerant from the receiver R through the valve HV to the compressor C. The amount of the gaseous refrigerant flowing from the receiver R to the compressor C is thus controlled by the pressure in the high side of the circuit in line 20. As the pressure in the receiver R in increased by the decrease of flow of the gaseous refrigerant to the compressor C, the level of the liquid refrigerant in the coil O will increase to maintain a balance between the gaseous pressure in the receiver R and the pressure of the gaseous refrigerant in the coil O plus the head of the liquid refrigerant in the coil O above the level R' of the liquid refrigerant. In the event the pressure on the high side of the circuit in line 20 becomes excessive so that it would cause an overloading of the compressor C, the valve head 38b is moved downwardly to reduce flow of refrigerant through port 30f. Such retarding of the refrigerant flow through the port 30f causes a back pressure to develop in the flow lines leading to the receiver R and the coil O so that there is a rapid equalization of the gaseous pressure in such receiver R and coil O to cause a rapid lowering of the level of the liquid refrigerant in the coil O. The reduction in the level of the liquid in the coil O causes less heat to be picked up at the coil O and therefore the pressure in the line 20 drops which then permits the valve head 38b to move upwardly for increased flow to the compressor C.

It has been found that when the outside air temperature is at about 60° F., the level O' of the liquid refrigerant in the coil O will be near the bottom of the coil O, and at about a 40° F., the level O' will be at about the intermediate portion of the coil O, approximately as shown in FIG. 1, and at a temperature of about 20° F. in the air or other surrounding medium, the level O' will be near the top of the coil or evaporator unit O. When the outside temperatures of the air or other medium falls below 20° F., the speed of operation of the compressor C, or the displacement of same are increased. In the form of the invention shown in FIG. 1, the compressor C is a variable speed compressor of any known type in which the speed of the compressor C may be increased for providing additional capacity for the apparatus. When the speed of the compressor C is increased, the amount of the gaseous refrigerant which is removed from the coil O is increased to reduce the pressure and the temperature of the refrigerant in the coil O which in turn increases the temperature difference between the outside air and the refrigerant to increase the heat transfer to the system. Such increased heat is ultimately available at the coil I which increases the pressure of the refrigerant in lines 20 and 36. The increase in such pressure causes an increased opening of the valve head 38a so as to increase the flow of gaseous refrigerant from the receiver R to the compressor C. As the pressure in the receiver R decreases, the level of the liquid refrigerant in the coil O decreases to reach the balance previously described. Therefore, it can be seen that the increasing of the speed of the compressor C serves to increase the capacity of the system and to also reduce the level O'. For example, assuming the compressor C is operating at its low speed, and assuming the level O' of the liquid refrigerant is near the top of the coil O, upon increasing the speed of the compressor C, the level of the liquid refrigerant in the coil O would drop gradually until it was near the lower part or bottom of the coil O and it would gradually rise as the outdoor temperatures decreased to temperatures even below 0° F. As will be explained hereinafter in connection with FIGS. 2 and 3, instead of using the variable speed compressor C as illustrated in FIG. 1, a plurality of compressors may be utilized so as to increase the displacement of compressors under such extreme operating conditions. In any event, it will be appreciated from the foregoing description of the operation of the apparatus and the carrying out of the method of this invention during the heating cycle, that the level of the refrigerant in the evaporator coil O is regulated in accordance with and in response to the demand for heat at the indoor coil I and therefore the amount of heat input at the evaporator coil O is correlated in proportion to the demand for heat at the indoor coil I. Additionally, such increase in heat is accomplished without the use of any resistance type electrical strip heaters or other supplemental heat as are conventionally used in heat pumps.

Another important feature of this invention resides in the full use of the heat in the refrigerant for evaporation purposes. Thus, the liquid refrigerant from the condenser coil I carries considerable unrejected heat as it flows to the receiver R. In ordinary refrigeration systems previously known, such hot refrigerant from the condenser would flow to the expansion valve, where expansion would take place; during such expansion, the heat of the liquid refrigerant produces flash gas as it is expanded in the evaporator and it is generally understood that there is a considerable amount of latent heat used during vaporization in the evaporator to reduce the temperature of the liquid in the coil O to the boiling point. However, in the present invention, the heat in the refrigerant flowing to the receiver R from the line 11 is utilized for evaporation in the receiver R and therefore all of the heat in the refrigerant is converted into latent heat which is carried off through line 32 to the compressor C without passing through the coil O, whereby the efficiency of the evaporator coil O is increased as compared to prior systems.

During the cooling cycle of the apparatus and method of this invention, the outdoor coil or heat transfer unit O serves as the condenser and the indoor coil or heat transfer unit serves as the evaporator. The refrigerant flows from the coil O through the line 10 to the receiver R. During the cooling cycle, the valve 33 is closed by the operation of the solenoid 33a and such valve 33 remains closed during such cooling cycle. The refrigerant from the receiver R flows through the line 11 to the expansion valve E. The check valve 29 prevents flow through the line 28 and the valve 16 is closed by the operation of the solenoid 15. Such solenoid 15 is operated by a suitable timing mechanism as will be explained hereinafter in connection with the defrost cycle. The refrigerant passing through the expansion valve E is expanded or reduced in pressure and therefore expansion of the refrigerent takes place in the indoor coil I to provide for cooling of the enclosure in which the coil I is located. The gaseous refrigerant then flows through line 20 to the reversing valve RV. The reversing valve RV is rotated so that the flow line 22a connects the flow line 20 with the flow line 43. The line 22b of the reversing valve RV connects the flow line 23 and the flow line 50. Therefore, the refrigerant from the line 20 flows to the flow line 43. The defrost valve DV is in the position shown in FIG. 1 to close the line 32a but to permit flow to the heat control valve HV. The valve HV is open for the flow of the refrigerant therethrough from the line 34 to the line 24 and thus to the compressor C. However, the valve member or head 38a is in the raised position to close the port 30e so that there is no flow from the line 32 through the valve HV.

The compressor discharges the refrigerant at the high pressure or on the high side of the circuit through the line 23, valve line 22b, and then to the line 50. The valve SV is closed so as to prevent fluid flow through the port 52d, but so as to permit fluid from the line 50 through the valve SV to the line 51 and then to the outdoor coil O. The apparatus of FIG. 1 thus functions as a normal refrigerant circuit on the cooling cycle.

The apparatus or method of this invention also includes a defrost cycle which may include the features and inventions of my United States Patents Nos. 2,748,571; 2,763,130; 2,807,145; and 2,904,967. The defrost cycle of the apparatus of this invention is for the purpose of removing frost or ice which has formed on the exterior of the coils of the outdoor unit O which occurs during the use of the device of this invention for the heating operation. In other words, when the outdoor coil O is used as an evaporator, and when the outdoor air or the temperature of the outdoor medium is sufficiently low, frost collects on the exterior of the coil O which interferes with the heat transfer and therefore prevents an effective operation of the apparatus. With this apparatus, the frost can be rapidly removed from the exterior of the outdoor coil O so that there is no substantial loss of time for the regular heating cycle within the house or other enclosure in which the indoor coil I is located. It will be readily appreciated that if the defrosting cycle takes thirty minutes or longer, the enclosure being heated will cool to such an extent that it will be noticeable and uncomfortable. Therefore, prolonged periods of defrosting cannot be used in a heat pump apparatus. The present invention accomplishes the removal of the frost without requiring long periods of time, and in fact, the frost can be removed from the coils of the outdoor unit O within a matter of a few minutes or even seconds.

For accomplishing such removal of the frost on the outdoor coil O during the heating cycle, the flow of the refrigerant is reversed by reversing the reversing valve RV from the position shown in FIG. 1 to the position previously described in connection with the cooling cycle. The valve 33 is opened and the valve 16 is opened. Since the indoor coil I has been on the heating cycle and therefore has been serving as a condenser, the refrigerant within the indoor coil I is hot. Such hot refrigerant is pumped with the compressor C so as to flow through the line 20, the valve line 22a, the line 43, the valve DV, the line 34, the valve HV, the line 24, and through the compressor C, to the discharge line 23. The discharge line 23 is connected through the flow line 22b of the reversing valve RV to the line 50 which directs the flow through the valve SV to the line 51 and then to the outdoor coil O. The hot refrigerant is thus directly pumped to the outdoor coil O which was previously serving as the evaporator and such hot refrigerant serves to quickly melt the frost on the exterior surface of the coil O. The defrost valve DV is open at its lower end to permit flow from the receiver R through the valve 33, line 32 and the line 32a to the chamber 42a for subsequent flow to the line 34 and ultimately to the compressor C. The removal of the gaseous refrigerant from the receiver R causes a reduction in the pressure in such receiver R so that less of the refrigerant in liquid form goes to the expansion coil I. It is to be noted, in that connection, that the expansion valve E is bypassed by reason of the open valve 16 which permits flow through the bypass line 14 directly to the coil I. Also, the lowering of the refrigerant gas pressure in the receiver R causes the lowering of the liquid level of the refrigerant in the outdoor coil O so as to more effectively transfer the heat from the hot refrigerant gases being fed to the coil O. Should the temperature and the pressure within the indoor coil I fall to a predetermined point so that an inadequate amount of heat is being supplied to the outdoor coil O from the refrigerant, the drop in pressure will be reflected at the valve DV so that the valve head 45a will move downwardly to close the line 32a to prevent flow into the chamber 42a. Thereafter, the pressure in the receiver will again increase which will force more of the liquid refrigerant to the coil I and ultimately the pressure of the refrigerant in the coil I will increase sufficiently to again open the defrost valve DV. In that way, the valve DV is opened and closed automatically in accordance with the amount of pressure in the indoor coil I. It is to be noted that the receiver R is functioning as an evaporator during such defrost cycle.

In connection with the superheat valve SV, it should be noted that the bulb 55 is connected with the high pressure charge in the chamber 52c so that when the temperature in the flow pipe 51 drops to a predetermined low temperature, the valve member 56 with its valve head 56a will move upwardly by the urging of the spring 57 to open the port 52d. Such opening of the port 52d increases the flow of the gaseous refrigerant from the receiver R through the valve SV and in that way, the level of the liquid refrigerant in the outdoor coil O is prevented from rising any further to prevent overflowing of liquid refrigerant into the line 51, whereby the flow of liquid refrigerant to the compressor C is prevented, and proper superheating of the gaseous refrigerant flowing to the compressor is maintained. Instead of the valve SV, the system may be charged with a critical amount of refrigerant in the known manner and in that case, the valve SV could be omitted.

Referring now to the form of the invention shown in FIG. 2, the apparatus or system in that form includes an outdoor unit or coil O which corresponds with the unit or coil O in FIG. 1. Also, the apparatus or system of FIG. 2 includes an indoor coil I which corresponds with the indoor coil or unit I of FIG. 1 and would be located for transferring heat therefrom to an enclosure or space within a building, housing or other area. The system of FIG. 2 also includes compressors C–1 and C–2 which are used instead of the variable speed compressor C of FIG. 1. Valves DV–1 and HV–1 are also included within the apparatus or system of FIG. 2 and they correspond generally with the valves DV and HV of FIG. 1, but are modified as will be explained. Also, receivers R–1 and R–2 are employed in the apparatus of FIG. 2 in place of the single receiver R of FIG. 1. The apparatus of FIG. 2 includes a reversing valve RV which is preferably the same as the reversing valve RV of FIG. 1.

The outdoor unit or coil O of the FIG. 2 form of the invention is connected to the receiver R–2 by a flow line 110 and an auxiliary flow line 110a. A bypass line 110b also connects with the line 110 and it includes a solenoid operated valve 116 which is operated by a solenoid 115. A capillary tube 114 is also connected with the line 110 and it connects with a flow line 132a having a check valve 117 therewith. The receiver R-2 has a float 170 therein for controlling the level of the liquid refrigerant in the receiver R-2, as will be explained more fully hereinafter. The receiver R-2 connects with the receiver R-1 through the flow line 132a. The receiver R-1 is connected with the indoor coil I through a flow line 111 which has a check valve 129 therein for permitting flow in the direction of the arrow only. A capillary tube 127 is also connected to the line 111 and it extends to the coil I for a purpose to be hereinafter explained.

The receiver R-1 is connected with the valve DV-1 through a flow line 132b.

The coil I is connected to the compressor C-1 through a flow line 120 which extends to the reversing valve RV and which connects with flow line 123 through movable port 122a in the movable portion 122 of the reversing valve RV. The valve DV-1 is connected with the compressor C-1 through line 134. The line 134 is connected to the suction side of the compressor C-1. The parts of the valve DV-1 which are identical to those parts described in connection with the valve DV in FIG. 1 bear like numerals, but the valve DV-1 has a modified arrangement wherein the valve 145 has a valve head 145a which is urged downwardly by a spring 145e engaged by a valve head 145f. The pressure acting downwardly on the valve 145 by the spring 47 is sufficient to maintain same in the closed position shown in FIG. 2 until a predetermined pressure is reached in the receiver R-1 which is sufficient to move the head 145a upwardly to overcome the spring 145e and permit flow of refrigerant from the line 132b to the line 134. Thus, a predetermined pressure is maintained in the receiver R-1 which is equal to or greater than the pressure in line 132 and the head exerted by the liquid in the coil O. Also, upon an excessive increase in the suction pressure in line 143, the valve 145f moves upwardly to close flow through the port 42d to thereby protect the compressor C-1 from being overloaded.

The valve DV-1 has a fluid flow line 143 connected thereto which leads to the reversing valve RV. When the valve RV is in the position shown in FIG. 2, the flow line 143 connects through the valve line 122b to a flow line 151 which connects with the outdoor coil O. A solenoid valve 133 which is operated by solenoid 133a is mounted in the line 151.

The valve HV-1 is similar to the valve HV shown in FIG. 1, except that it is modified so as to serve with only one inlet flow line 132 and one outlet flow line 124. The valve HV-1 includes a body 130 and an internal port 130a. The port 130a is closed by a valve member 138 which has a valve head 138a therewith. Such valve member 138 is connected to a diaphragm 135 above which is located fluid under pressure supplied from the line 120 through a connecting pressure line 136. The valve head 138a is urged upwardly by a resilient member or spring 139 which is adjustably positioned by an adjusting member 140 as explained in connection with the member 40 in FIG. 1. As will be explained, when the indoor coil I is serving as the condenser for transferring heat to a house or other enclosure, the pressure in the line 120 therefore in the line 136 is sufficient to overcome the force of the spring 139 to hold the valve head 138a unseated below the passage or port 130a. Therefore, flow through the valve HV-1 is permitted. However, on the cooling cycle, the indoor coil I is serving as an evaporator and the pressure in the line 120 and therefore in the line 136 is reduced sufficiently so that the spring 139 seats the valve head 138a to close the port 130a to prevent flow through the valve HV-1. The line 132 connects with the reservoir or receiver R-2 for the transfer of gaseous refrigerant from the receiver R-2 through the valve HV-1, as will be explained.

The second compressor C-2 is connected to the flow line 151 by means of a flow line 175. A bypass flow line 151a is connected to the flow line 175 and such line 151a has a check valve 150 connected therein for permitting flow in the direction of the arrow shown in FIG. 2 by preventing flow in the opposite direction to the arrow. The crankcase of the compressor C-2 also has a conventional pressure regulator 176 therewith for controlling the flow through the compressor C-2. A flow line 181 extends from the compressor C-2 for receiving the discharged high pressure refrigerant which passes through a check valve 182 to a coil 183 in the receiver R-1. Such coil 183 terminates in a plurality of openings or perforations 183a so that the refrigerant is discharged into the receiver R-1 from the coil 183 through such openings 183a. If desired, the compressors C-1 and C-2 as well as the other auxiliary equipment, including the receivers R-1 and R-2 may be confined within a case or housing 190.

In the use of the apparatus of FIG. 2 during a heating cycle, with only the compressor C-1 in operation, the refrigerant in gaseous form flows from the outdoor coil O through the flow line 151 and the valve RV to the valve DV-1 for flow to the compressor C-1. The refrigerant is discharged from the compressor C-1 at a high pressure to the high side of the circuit through the line 123 for feeding to the flow line 120 and then into the indoor coil I which serves as the condenser.

The liquid refrigerant in the lower part of the condenser coil I flows through the capillary tube 127 to the flow line 111. The check valve 129 prevents flow therethrough during the heating cycle. The refrigerant expands as it passes through the capillary tube so that there is normally a mixture of gaseous and liquid refrigerant which enters from the line 111 into the receiver R-1. Such expansion of the refrigerant causes an intermediate cooling of the liquid refrigerant so as to reduce the heat losses in the evaporator coil O during the heating cycle which might otherwise occur if latent heat of evaporation were utilized for cooling the liquid refrigerant in such coil O, as previously explained in connection with the FIG. 1 system. The liquid refrigerant in the lower portion of the receiver R-1 flows to the receiver R-2 through the line 132a and such liquid level is maintained constant by the float 170 within the receiver R-2. During the heating cycle, the valve DV-1 is closed to flow from the tube 132b to allow the gaseous refrigerant in the receiver R-1 to develop the predetermined pressure previously described, but it opens as described to allow flow when such pressure in the receiver R-1 exceeds the set predetermined pressure. The removal of the gaseous refrigerant from the receiver R-1 causes an evaporation of the refrigerant in the receiver R-1, as previously explained in connection with the receiver R in FIG. 1. Also, the gaseous refrigerant is withdrawn from the receiver R-2 because the valve HV-1 is open to permit fluid flow through the line 132, the valve HV-1 and the line 124 to the line 151 for thereby connecting same to the compressor C-1. The flow from the line 151 passes through the bypass line 151a during the heating cycle since the valve 133 is closed and then through the line 143, the valve DV-1, and the line 134 to the compressor C-1. The amount of the gaseous refrigerant withdrawn from the receiver R-2 controls the level of the liquid refrigerant in the outdoor coil O and such level of the liquid refrigerant is controlled in response to the demand for heat at the indoor coil I because of the connection 136 between the flow line 120 and the valve HV-1, as previously pointed out. In other words, when the demand for heat in the indoor coil I decreases, the pressure in the line 136 is increased sufficiently to open or increase the opening of the valve HV-1 and the level of the liquid refrigerant in the outdoor coil O falls to decrease the heat transfer area of the liquid refrigerant in the coil O. As previously explained in connection with FIG. 1, the level of the liquid in the outdoor coil determines the amount of heat intake to the refrigerant due to the fact that the amount of the liquid refrigerant exposed to the heat transfer determines the amount of evaporation which takes place. Thus, as the liquid level of the liquid refrigerant in the outdoor coil O rises, a greater heat transfer is effected between the air or other medium outside of the coil O to the liquid refrigerant therein and a greater amount of expansion of the refrigerant within the coil O is obtained. Such heat is then supplied to the system for use at the indoor coil I. Conversely, a lowering of the level of the liquid refrigerant in the outdoor coil O reduces the heat transfer and therefore reduces the amount of heat intake to the system.

When the outdoor temperature is sufficiently low so that additional displacement is required by the compressor, the second compressor C-2 which would be a low suction head and low pressure compressor is brought into the system. Such compressor C-2 may be automatically thrown into operation electrically by any suitable thermostatic controls which would operate to start the compressor C-2 at a temperature such as 20° F. and which would keep the compressor C-2 operating until the temperature outside of the coil O rose above that predetermined temperature of 20° F. or whatever temperature is set. When the second compressor C-2 is in operation, the refrigerant will flow through the line 175 from the line 151 and substantially no refrigerant will flow through the by pass line 151a. The refrigerant is discharged from the compressor C-2 through the flow line 181 and the check valve 182 into the coil 183 for discharge through the openings 183a to the receiver R-1. The valve DV-1 will function in the same manner as previously described to maintain an adequate pressure in the receiver R-1 while preventing an excess pressure from developing therein. The compressor C-1 is a high suction and high head pressure compressor and therefore the two compressors C-1 and C-2 operate satisfactorily together. When the second compressor C-2 is in operation in the system, the level of the liquid refrigerant in the outdoor coil O is lowered for a particular outdoor temperature and therefore in effect, the capacity of the system is increased. This is in accordance with the same general functioning of the apparatus of FIG. 1 in which the speed of the operation of the compressor C was increased.

During the cooling cycle with the apparatus of FIG. 2, the outdoor coil O serves as the condenser and the indoor coil I serves as the evaporator. The valve RV is reversed so that the valve line 122a connects the discharge line 123 and the line 151, while the valve line 122b connects the flow line 120 with the flow line 143. Also, during the cooling cycle, the valve HV-1 is closed to prevent fluid flow therethrough, the solenoid valve 133 is open and the solenoid valve 116 is closed. The gaseous refrigerant from the indoor coil I thus flows from the line 120 through the valve DV-1 and the compressor C-1 to the line 123 for flow to the outdoor coil O. Condensed liquid refrigerant flows from the outdoor coil O through the line 110 and the capillary tube 114 to the receiver R-1 where evaporation takes place for an intermediate cooling. The refrigerant then flows to the indoor coil I through the check valve 129 for the evaporation in the coil I to obtain the cooling which is used for cooling the enclosure such as a building or house. The valve DV-1 functions to control the level of the liquid refrigerant in the receiver R-1 by the setting of the spring 47 which is so set that the normal operating pressure of the refrigerant flowing to the valve DV-1 from line 143 is high enough to urge the valve 145 upwardly enough to take some of the force of the spring 145e off the valve head 145a. In that way, the pressure of the gaseous refrigerant in the receiver R-1 is maintained at a sufficient amount to provide a controlled level for the liquid refrigerant in the coil I for thereby controlling the cooling temperature at such coil I.

The compressor C-2 would not normally be needed or used on the cooling cycle. The flow for the defrost cycle of the invention is the same as the one described in connection with the cooling cycle except that the valve 116 is open during the defrost cycle so that the refrigerant does not flow through the capillary tube 114 during the defrost cycle.

In the form of the invention shown in FIG. 3, the outdoor unit or coil O and then indoor unit or coil I are substantially the same as the units or coils O and I in FIGS. 1 and 2. The apparatus of FIG. 3 also includes a receiver R, compressors C-1 and C-2, a defrost valve DV-2, a reverse valve RV and expansion valves E-1 and E-2. A control valve CV is also included in the apparatus or system of FIG. 3, the purpose of which will be explained hereinafter. A flow line 210 extends from the outdoor coil O to the receiver R, and such line 210 has a check valve 235 therein which permits flow in the direction of the arrow as shown in FIG. 3 but prevents flow in the opposite direction. A flow line 211 extends from the receiver R to the indoor coil I and such line 211 has a valve 216 which is operated by a solenoid 215 therein. Such solenoid valve 216 is open during the heating and defrost cycles, as will be explained, but is closed during the cooling cycle. The coil I is connected with the compressors C-1 and C-2 through line 220 which is in fluid communication with valve line 222a in the movable valve 222 of the valve RV. Such valve line 222a is in fluid communication with the flow line 223 which is connected to the compressor C-1. The compressor C-2 is also connected to the line 223 by a line 281. The suction sides of the compressors C-1 and C-2 are connected to the valve DV-2 through line 234. A flow line 243 connects the valve DV-2 and the reversing valve RV so that the fluid is adapted to flow through the valve line 222b from a flow line 251 connected to the outdoor coil O.

The valve DV-2 is of the same construction as the valve DV of FIG. 1 and therefore the same parts have identical numerals in both figures.

The valve CV is connected to a flow line 225 and to another flow line 226. The expansion valve E-2 is positioned in the flow line 226. The valve CV may be of various constructions, but as illustrated includes a body 80 which has lower chamber 80a, intermediate chamber 80b and upper chamber 80c. A connecting port 80d is positioned between the chamber 80b and the flow line 225. A valve member 81 is positioned within the body 80 for longitudinal movement for closing and opening the port 80d. When the valve 81 is in the raised or upper position, flow is permitted from the flow line 225 through the port 80d to the flow line 226. The valve member 81 is carried by a diaphragm 82 formed of flexible material which divides the chambers 80b and 80c as shown in FIG. 3. The chamber 80c is in fluid communication with the high side of the circuit through flow line 236 which connects with the flow line 220. The valve member 81 is urged upwardly by a resilient member such as the spring 82 which is mounted upon an adjustable member 83 for adjusting the amount of the upward force applied by such spring 82 to the valve member 81. The urging of the spring 82 is transmitted to the valve member 81 through guide rods 84 which are longitudinally movable in the body 80 through suitable openings in the central portion thereof. As will be more evident hereinafter, the pressure or force of the spring 82 acting on the valve 81 is set so that the pressure in the line 220 controls the opening and closing of the valve 81.

The expansion valve E-1 is connected to a flow line 217 which is in fluid communication with the flow line 211. The expansion valve E-1 is opened and closed in the known manner by any suitable means such as a temperature bulb control 259. Similarly, the expansion valve E-2 is opened and closed in the known manner by any suitable means such as the bulb control indicated at 255 in FIG. 3. The receiver R is connected with the defrost valve DV-2 through flow control line 232 which has a solenoid operated valve 233 therewith which is actuated by any suitable control such as a solenoid 233a.

Such valve 233 is closed except during the defrost cycle.

Considering now the operation of the form of the invention shown in FIG. 3, and considering first the operation during the heating cycle, at such time, the outdoor coil O serves as an evaporator and the indoor coil I serves as the condenser. The refrigerant flows through the line 251 from the evaporator coil O, then through the valve line 222b to the flow line 243 and then through the defrost valve DV-2 to the compressors C-1 and C-2. At the higher outdoor temperatures, generally at the temperatures above 20° F., only the compressor C-1 is used, but at temperatures below 20° F., and also under certain other operating conditions, the compressor C-2 is also employed in conjunction with the compressor C-1. The refrigerant is discharged from the compressor C-1 through the line 223, the valve line 222a, and the flow line 220 to the condenser I. When the compressor C-2 is employed, it likewise discharges through line 281 to the line 223 and from there to the indoor coil I. The expansion valve E-1 is closed by reverse pressure in the known manner.

The condensed refrigerant flows through the line 211 and the open valve 216 to the receiver R. From the receiver R, the liquid refrigerant flows to the control valve CV and then to the expansion valve E-2 which is normally open, except when the liquid level of the refrigerant in the coil O reaches a point near the bulb 255 at which time the valve E-2 is moved towards closed position to reduce the liquid level in the coil O.

The valve CV remains open so long as the pressure of the refrigerant in the line 220 is below a predetermined amount which is determined by the setting of the spring pressure with the spring 82. However, when the heat requirements at the indoor coil I decrease so that a pressure increase occurs in the line 220 which is sufficient to overcome the force of the spring 82, the valve member 81 will move downwardly towards the port 80d and to thereby decrease, and in some cases to even close, the flow of the refrigerant from the receiver R to the outdoor coil O. The level of the liquid refrigerant in the coil O will therefore gradually fall because of the continued evaporation of the refrigerant in the coil O and because of the fact that the liquid refrigerant is not being supplied to the coil O any longer. When the level of the liquid refrigerant in the coil O lowers sufficiently, then the heat transfer is reduced and a smaller amount of heat is imparted to the system for transfer at the indoor coil I. Thus, the level of the liquid refrigerant in the coil O is again regulated in accordance with the demand for heat at the indoor coil I.

During the cooling cycle, the reversing valve RV is rotated to cause the line 222a to connect the flow line 220 and the flow line 243, and the valve line 220b is aligned with the flow lines 223 and 251. The indoor coil I then serves as an evaporator and the outdoor coil O then serves as a condenser. The solenoid actuated valve 216 is closed and the control valve CV is closed because of the low pressure in the line 236. Therefore, the refrigerant flows from the coil I through line 220 to line 243 and then to one of the compressors since only one of such compressors would be needed for the cooling cycle. The compressor in use discharges its refrigerant to the high side of the circuit through line 223 to line 251 for condensing such refrigerant in the outdoor coil O. The condensed refrigerant flows through line 210 and the check valve 235 to the receiver R. It is to be noted that the expansion valve E-2 is closed by the back pressure from the coil O in the known manner.

The refrigerant from the receiver R flows through the line 211 to the line 217 and then through the expansion valve E-1 to the indoor coil I where the expansion of the refrigerant takes place and therefore the cooling action takes place. It is to be noted that the expansion valve E-1 is operable during the cooling cycle because of the fact that the temperature bulb control 259 is adjacent to the low pressure and low temperature line 220 during such cooling cycle.

The refrigerant flows in the same direction during both the cooling and defrost cycles but during the defrost cycle, the solenoid valve 233 is open and the valve DV-2 functions to control the flow of gaseous refrigerant from the receiver R in the same manner as previously described in connection with the valve DV in FIG. 1. The solenoid operated valve 216 is likewise open to bypass the expansion valve E-1. The opening of the line 232 to the defrost valve DV-2 and therefore to the compressor serves to remove the gaseous pressure in the receiver R and therefore cause evaporation therein which reduces the level of the refrigerant in the outdoor coil O during the defrost operation. The hot refrigerant from the indoor coil I is thus transmitted to the outdoor coil O to remove the frost from the exterior of such coils, in the same manner as previously explained in connection with FIGS. 1 and 2.

It will be understood that in place of the pair or plurality of compressors C-1 and C-2 illustrated in FIG. 3, a variable speed compressor such as the compressor C shown in FIG. 1 may be utilized. It will also be understood that other known methods of increasing and decreasing compressor displacement may be utilized within the scope of this invention. Also, it will be understood that the valves illustrated are merely exemplary and various valve constructions may be used in connection with the apparatus of this invention and in carrying out the method of this invention.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A refrigeration apparatus having a heating cycle and a cooling cycle, comprising an indoor heat transfer unit adapted to be located in an enclosure to be heated and cooled for maintaining a selected narrow temperature range within the enclosure, an outdoor heat transfer unit adapted to be exposed to changing temperatures outside of the enclosure, one of said units serving as an evaporator and the other of said coils serving as a condenser on each cycle, a compressor for compressing refrigerant, means connecting said compressor between said indoor unit and said outdoor unit for directing refrigerant from said indoor unit to said compressor and then to said outdoor unit during the cooling cycle and for directing refrigerant from said outdoor unit to said compressor and then to said indoor unit during the heating cycle, and means for decreasing the level of the liquid refrigerant in the unit serving as the evaporator during the heating cycle in response to a decrease in the demand for heat from the unit serving as the condenser for controlling the amount of heat transfer surface used for the transfer of heat by the evaporator in response to the demand for heat from the unit serving as the condenser during the heating cycle.

2. A refrigeration apparatus having a heating cycle and a cooling cycle, comprising an indoor heat transfer unit adapted to be located in an enclosure to be heated and cooled for maintaining a selected narrow temperature range within the enclosure, an outdoor heat transfer unit adapted to be exposed to changing temperatures outside of the enclosure, one of said units serving as an evaporator and the other of said coils serving as a condenser on each cycle, a compressor for compressing refrigerant, means connecting said compressor between said indoor unit and said outdoor unit for directing refrigerant from said indoor unit to said compressor and then to said outdoor unit during the cooling cycle and for directing refrigerant from said outdoor unit to said compressor and then to said indoor unit during the heating cycle, means for raising the level of the liquid refrigerant in the unit serving as the evaporator in response to an increase in demand for heat on the high side of the circuit, and means for lowering the level of the liquid refrigerant in the evaporator in response to a decrease in demand for heat on the high side of the circuit, whereby the rate of heat absorption on the low side of the circuit is proportionate to the demand for heat on the high side of the circuit.

3. A refrigeration apparatus having a heating cycle and a cooling cycle, comprising an indoor heat transfer unit adapted to be located in an enclosure to be heated and cooled for maintaining a selected narrow temperature range within the enclosure, an outdoor heat transfer unit adapted to be exposed to changing temperatures outside of the enclosure, one of said units serving as an evaporator and the other of said coils serving as a condenser on each cycle, a compressor for compressing refrigerant, means connecting said compressor between said indoor unit and said outdoor unit for directing refrigerant from said indoor unit to said compressor and then to said outdoor unit during the cooling cycle and for directing refrigerant from said outdoor unit to said compressor and then to said indoor unit during the heating cycle, a flow line extending from said outdoor unit to said indoor unit, a receiver in said flow line for receiving refrigerant, valve means connected between the low pressure side of said compressor and said receiver, and an operating means for said valve means connected to the high pressure side of said compressor for opening and closing said valve means in response to changes in said high pressure side for thereby controlling the level of the liquid refrigerant in the unit serving as the evaporator during the heating cycle for controlling the amount of heat transfer surface used for the transfer of heat by the evaporator in response to the demand for heat from the unit serving as the condenser during the heating cycle.

4. A refrigeration apparatus having a heating cycle and a cooling cycle, comprising an indoor heat transfer unit adapted to be located in an enclosure to be heated and cooled for maintaining a selected narrow temperature range within the enclosure, an outdoor heat transfer unit adapted to be exposed to the changing temperatures outside of the enclosure, one of said units serving as an evaporator and the other of said coils serving as a condenser on each cycle, a variable speed compressor for compressing refrigerant, means connecting said compressor between said indoor unit and said outdoor unit for directing refrigerant from said indoor unit to said compressor and then to said outdoor unit during the cooling cycle and for directing refrigerant from said outdoor unit to said compressor and then to said indoor unit during the heating cycle, and means for controlling the level of the liquid refrigerant in the unit serving as the evaporator during the heating cycle for controlling the amount of heat transfer surface used for the transfer of heat by the evaporator in response to the demand for heat from the unit serving as the condenser during the heating cycle.

5. A refrigeration apparatus having a heating cycle and a cooling cycle, comprising an indoor heat transfer unit adapted to be located in an enclosure to be heated and cooled for maintaining a selected narrow temperature range within the enclosure, an outdoor heat transfer unit adapted to be exposed to changing temperatures outside of the enclosure, one of said units serving as an evaporator and the other of said coils serving as a condenser on each cycle, a plurality of compressors for compressing refrigerant, means connecting said compressors between said indoor unit and said outdoor unit for directing refrigerant from said indoor unit to said compressor and then to said outdoor unit during the cooling cycle and for directing refrigerant from said outdoor unit to said compressor and then to said indoor unit during the heating cycle, and means for controlling the level of the liquid refrigerant in the unit serving as the evaporator during the heating cycle for controlling the amount of heat transfer surface used for the transfer of heat by the evaporator in response to the demand for heat from the unit serving as the condenser during the heating cycle.

6. A refrigeration apparatus having a heating cycle and a cooling cycle, comprising an indoor heat transfer unit adapted to be located in an enclosure to be heated and cooled for maintaining a selected narrow temperature range within the enclosure, an outdoor heat transfer unit adapted to be exposed to changing temperatures outside of the enclosure, one of said units serving as an evaporator and the other of said coils serving as a condenser on each cycle, a compressor for compressing refrigerant, means connecting said compressor between said indoor unit and said outdoor unit for directing refrigerant from said indoor unit to said compressor and then to said outdoor unit during the cooling cycle and for directing refrigerant from said outdoor unit to said compressor and then to said indoor unit during the heating cycle, a receiver for receiving refrigerant, a first flow line connecting the unit serving as the evaporator with said receiver, a second flow line connecting said receiver and said compressor, a valve in said second line for controlling the flow of refrigerant from said receiver to said compressor, and control means operable during the heating cycle in response to the heat demand by the unit serving as the condenser for controlling the opening and closing of said valve for thereby controlling the levels of the liquid refrigerant in said receiver and in said unit serving as the evaporator, whereby the liquid refrigerant level in the evaporator unit is controlled to vary the heat transfer surface in use in response to the demand for heat from the condenser unit.

7. A refrigeration apparatus having a heating cycle and a cooling cycle, comprising an indoor heat transfer unit adapted to be located in an enclosure to be heated and cooled for maintaining a selected narrow temperature range within the enclosure, an outdoor heat transfer unit adapted to be exposed to changing temperatures outside of the enclosure, one of said units serving as an evaporator and the other of said coils serving as a condenser on each cycle, a compressor for compressing refrigerant, means connecting said compressor between said indoor unit and said outdoor unit for directing refrigerant from said indoor unit to said compressor and then to said outdoor unit during the cooling cycle and for directing refrigerant from said outdoor unit to said compressor and then to said indoor unit during the heating cycle, a receiver for receiving refrigerant, a first flow line connecting the unit serving as the evaporator with said receiver, a second flow line from said receiver to said condenser, said compressor being in said second flow line, a valve in said flow line controlling refrigerant flow from said receiver to the unit serving as the evaporator, and means for controlling the opening and closing of said valve during the heating cycle in response to demand for heat from the unit serving as the condenser for thereby controlling the level of the liquid refrigerant in the unit serving as the evaporator in response to the demand for heat from the condenser unit.

8. A refrigeration apparatus adapted to be used for heating an enclosure, comprising a condenser adapted to condense refrigerant for transferring heat to the enclosure, an evaporator for evaporating refrigerant for taking up heat, flow lines connecting said condenser to said evaporator for the flow of refrigerant from said condenser to said evaporator and for connecting said evaporator to said condenser for the flow of refrigerant from said evaporator to said condenser to thereby provide a closed refrigeration circuit, a compressor connected in the flow lines for compressing the refrigerant flowing to the condenser, and means for decreasing the level of the liquid refrigerant in the evaporator in response to decreases in the demand for heat from the condenser.

9. A refrigeration apparatus adapted to be used for heating an enclosure, comprising a condenser adapted to condense refrigerant for transferring heat to the enclosure, an evaporator for evaporating refrigerant for taking up heat, flow lines connecting said condenser to said evaporator for the flow of refrigerant from said condenser to said evaporator and for connecting said evaporator to said condenser for the flow of refrigerant from said evaporator to said condenser to thereby provide a closed refrigeration circuit, a compressor connected in the flow lines for compressing the refrigerant flowing to the condenser, means for controlling the level of the liquid refrigerant in the evaporator in response to the demand for heat from the condenser, and means for selectively directing the refrigerant from said compressor to said evaporator for rapidly defrosting the evaporator, and means for decreasing the level of the liquid in said evaporator while directing the refrigerant from said compressor to said evaporator for facilitating the defrosting of said evaporator.

10. A refrigeration apparatus adapted to be used for heating an enclosure, comprising a condenser adapted to condense refrigerant for transferring heat to the enclosure, an evaporator for evaporating refrigerant for taking up heat, flow lines connecting said condenser to said evaporator for the flow of refrigerant from said condenser to said evaporator and for connecting said evaporator to said condenser for the flow of refrigerant from said evaporator to said condenser to thereby provide a closed refrigeration circuit, a compressor connected in the flow line for compressing the refrigerant flowing to the condenser, means for controlling the level of the liquid refrigerant flowing to the condenser, means for controlling the level of the liquid refrigerant in the evaporator in response to the demand for heat from the condenser, means for varying the compressor capacity for handling varying quantities of vaporized refrigerant, and means for decreasing the level of the liquid refrigerant in the evaporator upon an increase in the compressor capacity.

11. A refrigeration apparatus adapted to be used for heating an enclosure, comprising a condenser adapted to condense refrigerant for transferring heat to the enclosure, an evaporator for evaporating refrigerant for taking up heat, flow lines connecting said condenser to said evaporator for the flow of refrigerant from said condenser to said evaporator and for connecting said evaporator to said condenser for the flow of refrigerant from said evaporator to said condenser to thereby provide a closed refrigeration circuit, a plurality of compressors connected in the flow line from said evaporator to said condenser, a receiver connected intermediate said compressors, and means for controlling the level of the liquid refrigerant in said evaporator in response to the demand for heat from said condenser.

12. A heat pump apparatus comprising, a closed refrigeration circuit including a condenser for rejecting heat on the high side of said circuit, an evaporator for absorbing heat on the low side of said circuit, compressor means for removing and compressing gaseous refrigerant from the low side of said circuit to transfer heat from said evaporator to said condenser for rejection thereby, means for increasing the compressor capacity to increase the range of temperature operation of the evaporator from a first temperature range to a lower temperature range, means including a receptacle and a control valve between said evaporator and said compressor, and means connecting said control valve to the high side of said circuit for controlling the level of the liquid refrigerant in said evaporator to control the amount of heat transfer surface used for the transfer of heat within each temperature range in response to the demand for heat on the high side of said circuit.

References Cited in the file of this patent
UNITED STATES PATENTS

| | | |
|---|---|---|
| 2,498,861 | Newton | Feb. 28, 1950 |
| 2,715,317 | Rhodes | Aug. 16, 1955 |
| 2,977,773 | De Kanter | Apr. 4, 1961 |